(12) United States Patent
De Roeck

(10) Patent No.: US 8,967,641 B2
(45) Date of Patent: Mar. 3, 2015

(54) BALANCE BIKE

(75) Inventor: Sebastian De Roeck, West-malle (BE)

(73) Assignee: The Chillafish Company NV (BE)

( * ) Notice: Subject to any disclaimer, the term of this patent is extended or adjusted under 35 U.S.C. 154(b) by 0 days.

(21) Appl. No.: 13/997,093

(22) PCT Filed: Dec. 13, 2011

(86) PCT No.: PCT/IB2011/055649
§ 371 (c)(1),
(2), (4) Date: Jun. 21, 2013

(87) PCT Pub. No.: WO2012/085760
PCT Pub. Date: Jun. 28, 2012

(65) Prior Publication Data
US 2013/0277934 A1    Oct. 24, 2013

(30) Foreign Application Priority Data

Dec. 22, 2010 (BE) .................................. 2010/0751

(51) Int. Cl.
*B62K 13/04* (2006.01)
*B62K 9/02* (2006.01)
*B62K 13/08* (2006.01)

(52) U.S. Cl.
CPC . *B62K 9/02* (2013.01); *B62K 13/04* (2013.01); *B62K 13/08* (2013.01)
USPC .................. 280/87.021; 280/87.01; 280/295; 280/7.1; 280/7.15

(58) Field of Classification Search
CPC ........ B62K 13/00; B62K 13/04; B62K 13/08; B62K 9/00; B62K 9/02; B62H 1/12
USPC ......... 280/87.021, 85.05, 293, 295, 298, 287, 280/278, 87.01, 7.1, 7.15
See application file for complete search history.

(56) References Cited

U.S. PATENT DOCUMENTS

| | | | | |
|---|---|---|---|---|
| 1,637,129 A | * | 7/1927 | Pritchett | 280/87.041 |
| 2,209,058 A | * | 7/1940 | Johnson | 280/7.15 |
| 2,212,741 A | * | 8/1940 | Johnson | 280/7.1 |
| 5,133,569 A | * | 7/1992 | Rieber et al. | 280/293 |
| 5,556,116 A | * | 9/1996 | Sloss et al. | 280/7.15 |

(Continued)

FOREIGN PATENT DOCUMENTS

| | | | |
|---|---|---|---|
| DE | 202010001311 | | 4/2010 |
| GB | 2466825 A | * | 7/2010 |

(Continued)

OTHER PUBLICATIONS

International Search Report for PCT/IB2011/055649, Completed by the European Patent Office on Mar. 9, 2012, 3 Pages.

*Primary Examiner* — J. Allen Shriver, II
*Assistant Examiner* — Steve Clemmons
(74) *Attorney, Agent, or Firm* — Brooks Kushman PC

(57) ABSTRACT

Balance bike having a frame provided with a steering bush or holder for rotatably holding handlebars with a front wheel fork whereby one or several front wheels are connected to the front wheel fork and whereby the balance bike having two back wheels, characterised in that the frame of the balance bike having two frame parts which are directly or indirectly hinge-mounted at a distance (D) from one another to the steering bush or holder by hinges from where the frame parts extend up to a distance thereof and are each provided with a back wheel.

10 Claims, 3 Drawing Sheets

(56) References Cited

U.S. PATENT DOCUMENTS

| | | | | |
|---|---|---|---|---|
| D392,343 S | * | 3/1998 | Sloss | D21/435 |
| 7,455,308 B2 | * | 11/2008 | Michelau et al. | 280/282 |
| 7,487,982 B2 | * | 2/2009 | Chan | 280/87.01 |
| D588,205 S | * | 3/2009 | Kruger et al. | D21/423 |
| 7,597,331 B2 | * | 10/2009 | Schulte et al. | 280/7.15 |
| 7,837,209 B2 | * | 11/2010 | Spencer et al. | 280/87.042 |
| 7,988,168 B2 | * | 8/2011 | Miroewski | 280/200 |
| 2006/0082097 A1 | * | 4/2006 | Michelau et al. | 280/282 |
| 2006/0243507 A1 | | 11/2006 | Huber | |
| 2008/0277901 A1 | * | 11/2008 | Catelli et al. | 280/287 |
| 2010/0283220 A1 | * | 11/2010 | Tzoreff | 280/281.1 |

FOREIGN PATENT DOCUMENTS

| | | | |
|---|---|---|---|
| GB | 2467624 A | * | 8/2010 |
| GB | 2469092 A | * | 10/2010 |
| WO | 2008140140 | | 11/2008 |
| WO | 2009090683 | | 7/2009 |

* cited by examiner

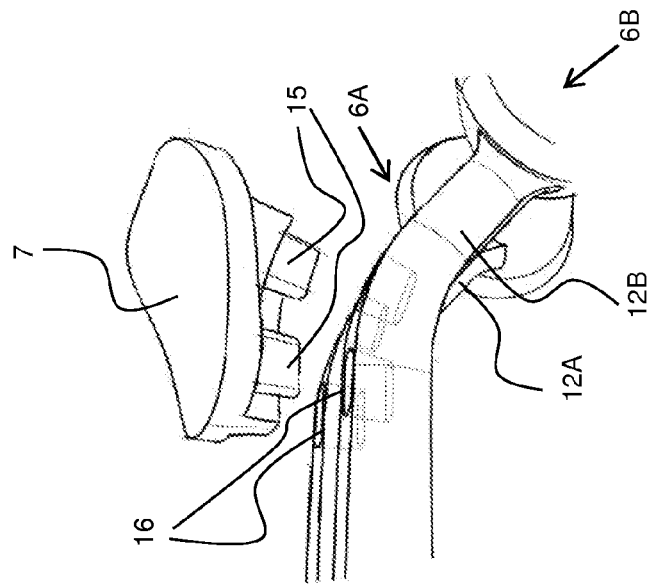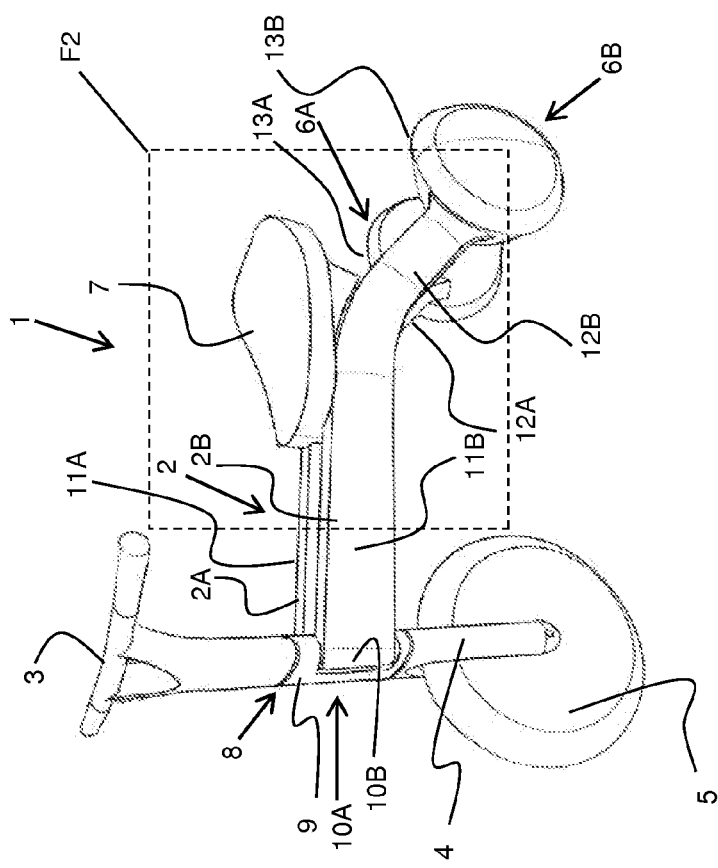

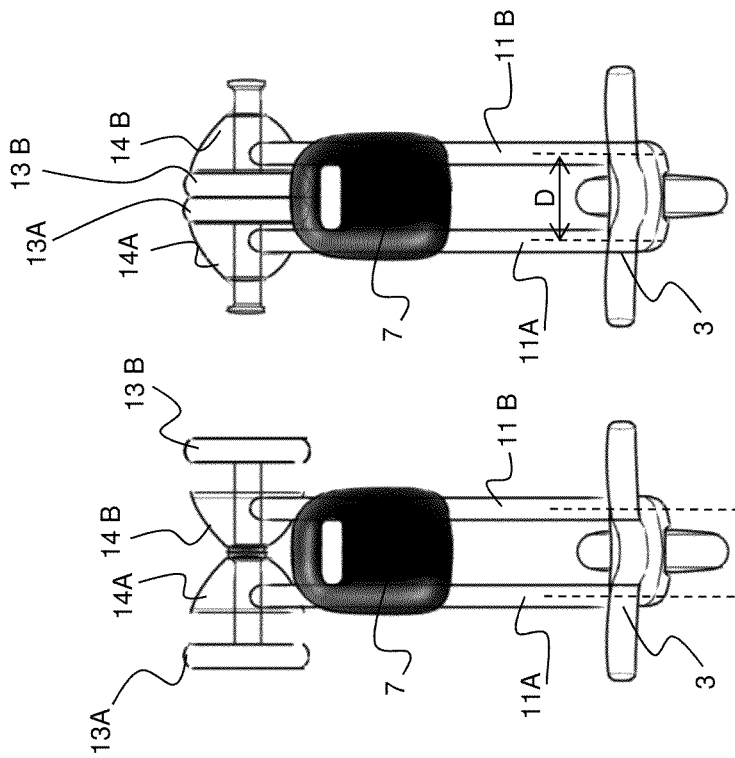
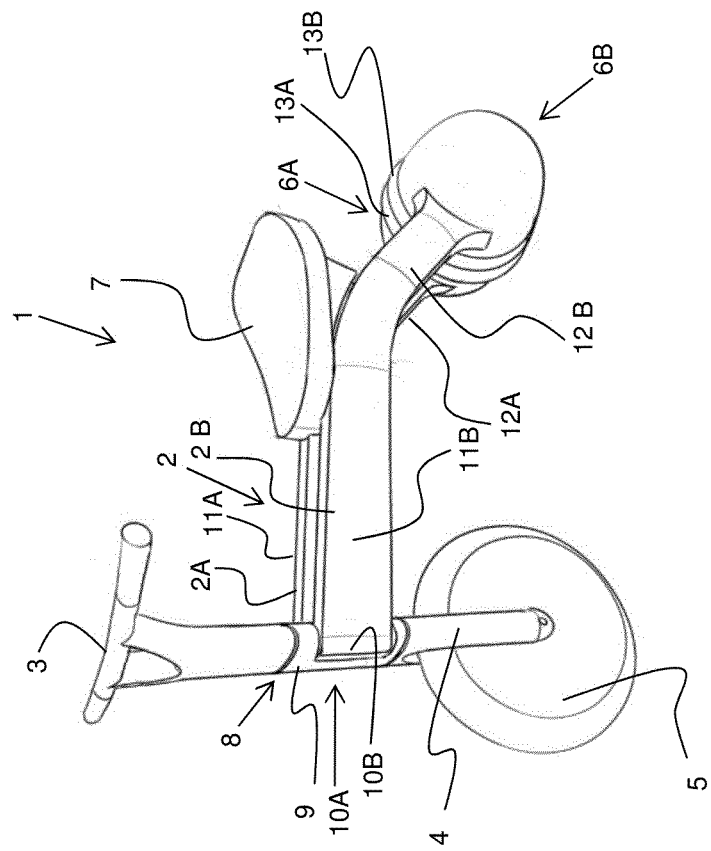

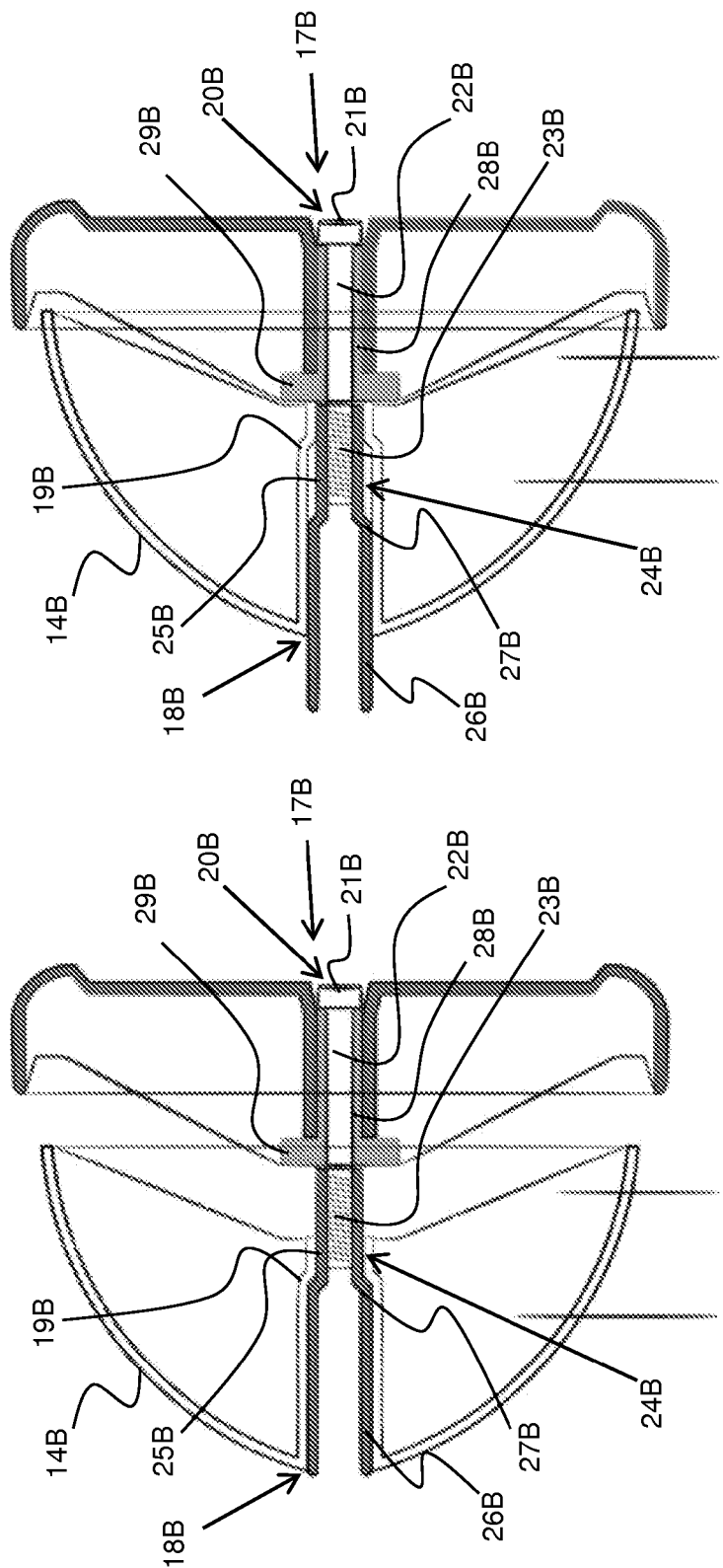

BALANCE BIKE

CROSS-REFERENCE TO RELATED APPLICATION

This application is the U.S. national phase of PCT Application No. PCT/IB2011/055649 filed on Dec. 13, 2011, which claims priority to BE Patent Application No. BE 2010/0751 filed on Dec. 22, 2010, the disclosures of which are incorporated in their entirety by reference herein.

The present invention concerns a balance bike, in particular for children.

Balance bikes are well known. They are bikes without pedals. Moving is possible by pushing off with the feet. A balance bike is usually provided with a saddle that will support the body weight.

Further, a balance bike comprises a support structure called a frame, handlebars, one or two front wheels and one or more back wheels.

The double front or back wheels are provided at a distance from one another and offer a broader support base.

This broader support base is useful for small children, i.e. toddlers and preschoolers still lacking the necessary sense of balance or equilibrium.

The balance bike with double back wheels and/or double front wheels is less likely to tilt sideways as long as the centre of gravity of the balance bike and the child are situated above the triangle or rectangle formed by the points of contact of the balance bike with the ground, at least assuming that curves are not being taken too fast.

However, the problem is that such a wider base is mainly useful for the very young, but after some practice and as the children get older, it is useful to have the child use a balance bike which does not have a broader base, or only to a lesser extent.

In this way, the sense of balance and equilibrium is strengthened as an ideal preparation for the use of a conventional bicycle, i.e. with pedals and a transmission such as a chain or the like.

In other words, several balance bikes will have to be bought to that end.

Convertible balance bikes exist which can offer a broad as well as a narrow base, but converting the known convertible balance bikes is often laborious.

The present invention aims to remedy one or several of the above-mentioned and/or other disadvantages.

To this end, the invention concerns a balance bike comprising a frame provided with a steering bush or holder or the like to hold handlebars with a front wheel fork in a rotating manner, whereby one or several front wheels are connected to said front wheel fork, and whereby the balance bike comprises two back wheels, whereby the balance bike is characterised in that the frame is formed of two frame parts which are directly or indirectly hinge-mounted at a distance D from one another to the steering bush or holder or the like from where the frame parts extend up to a distance thereof and are each provided with a wheel.

According to a preferred embodiment, the frame parts are mainly L-shaped. In other words, they comprise a main bar or main bridge part and a rear bar or rear bridge part.

The rear bar can be made shorter than the main bar and preferably arranged somewhat slantingly in relation to the main bar.

Although the main bar preferably has a flat shape, the rear bar can be formed such that it protrudes from the plane formed by the main bar, such that the rear bar not only slants in relation to the main bar but also protrudes from the plane formed by the main bars.

In order to better explain the characteristics of the invention, the following preferred embodiments of a balance bike according to the invention are described by way of example only, with reference to the accompanying drawings, in which:

FIG. 1 shows a balance bike according to the invention;

FIG. 2 is an exploded view in greater detail of the part indicated by F2 in FIG. 1;

FIG. 3 shows the balance bike as represented in FIG. 1 in another position of use;

FIGS. 4 and 5 are views from above of another embodiment of a balance bike according to the invention, in two alternative positions of use;

FIGS. 6 and 7 are sections in greater detail of a back wheel in the corresponding position of use of FIG. 4, FIG. 5 respectively.

FIG. 1 shows a balance bike 1 according to the invention.

The balance bike 1 comprises a frame 2 with handlebars 3 on one far end and a front wheel fork 4 with one front wheel 5 in this case, connected to the latter.

On the other far end, the frame 2 is provided with two back wheels 6A and 6B.

In an intermediate position, the frame 2 is provided with a saddle 7.

The combination of the handlebars 3 and the front wheel fork 4 is provided freely rotatingly in and held by what is called the steering bush 8 which in this case is a passage provided in a specific frame head 9.

Said frame head 9 comprises two hinges 10A and 10B, one on either side of the steering bush 8.

These hinges 10A and 10B are designed for the hinged connection of two frame parts 2A and 2B forming the frame 2 to the frame head 9.

Moreover, the axes of the hinges 10A and 10B run parallel to the axis of the steering bush 8.

Each frame part 2A and 2B has a slender, elongated L-shape in this case.

In particular, each frame part 2A and 2B has a straight and mainly flat main bridge part 11A, 11B respectively in this case, and a rear bridge part 12A, 12B respectively directed slantingly in relation to the latter.

Note that the rear bridge part 12A and 12B not only slant in relation to the main bridge part 11A, 11B respectively, but also protrude from the plane formed of the main bridge part 11A, 11B respectively.

Both frame parts 2A and 2B thereby differ so much that the respective rear bridge parts 12A and 12B protrude from the accompanying plane in opposite directions.

The main bridge parts 11A and 11B also slant somewhat obliquely in relation to the supposedly horizontal bottom surface.

Said oblique arrangement is obtained by the appropriate combination of different parameters such as the length of the front wheel fork 4, the diameter of the front wheel 4, the positioning of the hinges 10A and 10B, the design of the frame 2 and the diameter of the back wheels 6A and 6B.

All this results in what is called trail, improving the stability and behaviour of the handlebars.

The trail is the distance between the intersection of the axis of the steering bush 8 with the ground on the one hand, and the point of contact of the front wheel 5 with the ground on the other hand.

We talk about trail when the last-mentioned point of contact of the front wheel 5 with the ground is situated more backward than the first-mentioned intersection of the axis of the steering bush 8 with the ground.

Each of the back wheels 6A and 6B is provided at the free end of the accompanying rear bridge part 12A, 12B respectively.

The back wheels 6A and 6B have a special structure and are provided in particular with a bearing edge 13A and 13B, i.e. the circular edge of the wheel 6A and 6B which makes contact with the ground, which bearing edges 13A and 13B protrude laterally alongside the rear bridge part 12A, 12B concerned respectively, in particular in the same direction in which the rear bridge part 12A, 12B concerned protrudes from the plane formed by the accompanying main bridge part 11A, 11B respectively.

The most laterally located parts of the back wheels 6A and 6B are situated at a distance alongside the plane formed by the main bridge part 11A, 11B concerned respectively, which is maximally half and preferably exactly half the distance D between the main bridge parts 11A and 11B, at least measured from the centre lines of the main bridge parts 11A and 11B.

The free ends of the rear bridge parts 12A and 12B are provided with mainly semi-spherical caps 14A and 14B which are fixed to the rear bridge parts 12A, 12B respectively.

In the given embodiment, said caps have been integrated, i.e. fixed to the respective frame parts 2A and 2B.

As shown in FIG. 2, the saddle 7 has protrusions 15 at the bottom which can work in conjunction with recesses 16 provided in both frame parts 2A and 2B.

These recesses 16 are provided at the transition of the main bridge parts 12A and 12B to the accompanying rear bridge parts 12A and 12B in this case.

The working and use of such a balance bike 1 according to the invention is simple and as follows.

The balance bike 1 in the position of use as shown in FIG. 1 can be used by children who do not have a sufficient sense of balance and equilibrium yet.

Indeed, thanks to the diverging rear bridge parts 12A and 12B, and additionally the more outward bearing edges 13A and 13B of the back wheels 6A and 6B, a broad support base is offered.

In this embodiment, the caps 14A and 14B guarantee the mutual distance of the back wheels 6a and 6B and offer additional protection.

A balance bike 1 with such a broad support base is less likely to tilt sideways. Also, this position of use is called the stable position.

Thanks to the trail which is created as described, a stably controllable balance bike is obtained.

The balance bike 1 according to the invention can be easily converted into an alternative position of use as shown in FIG. 3.

Converting is done by lifting the saddle 7, as a result of which the protrusions 15 are removed from the recesses 16.

The protrusions 15, in co-operation with the recesses 16, serve as means for the mutual connection of the frame parts 2A and 2B here.

Thus are obtained freely rotating frame parts 2A and 2B which can each be rotated along the opposite side, in other words mainly 180° around the hinges 10A and 10B.

In this position, it is possible to provide the saddle 7 again.

This second position of use of the balance bike 1 according to the invention, as shown in FIG. 3, is fit for children who already have some sense of balance and equilibrium or are ready to acquire it.

Also, this second position of use is called the balance position.

Thanks to the now converging rear bridge parts 12A and 12B, and additionally the even more inwardly situated bearing edges 13A and 13B of the back wheels 6A and 6B, a narrow or quasi single support base is offered.

In this position, the bearing edges 13A and 13B of the back wheels 6A and 6B are almost adjacent to each other.

The caps 14A and 14B are directed laterally outward.

Note that the above-mentioned trail is preserved in this second position of use of the balance bike 1 according to the invention.

It is clear that the saddle 7 must not necessarily assume a connection function for the frame parts 2A and 2B.

Said frame parts 2A and 2B can also be mutually connected and kept at a fixed distance in alternative ways.

Neither the specific design of the back wheels 6A and 6B, nor the trail obtained by a variety of parameters are necessary for a simple conversion of the balance bike 1 between both above-mentioned positions of use.

Thus, the back wheels 6A and 6B can be common wheels, whereby the bearing edges 13A and 13B are provided centrally on the wheels.

These are only preferred characteristics.

It is also possible to manufacture the frame parts 2A and 2B alternatively and nevertheless obtain the aimed effect of a simple conversion.

Indeed, as shown in FIGS. 4 and 5, representing an alternative balance bike 1 according to the invention in two analogous positions of use, it is possible to make the frame parts 2A and 2B mainly flat or non-diverging, i.e. non-converging if the balance bike 1 is situated in the second position of use or the balance position.

Indeed, such flat frame parts 2A and 2B can be provided with adjustable back wheels 6A and 6B to co-operate with.

Such adjustable back wheels 6A and 6B are represented as an example in FIGS. 6 and 7, in different positions of use respectively.

The back wheels of the invention are depicted in FIGS. 6 and 7. For brevity, only the elements of the "B" wheel are disclosed, but the corresponding elements of the "A" wheel are implicitly included. The corresponding elements of the "A" wheel are similar to the elements of the "B" wheel. For example, the element 17B of wheel "B" as depicted in FIG. 6 has a corresponding element 17A at a similar location on the "A" wheel.

Every back wheel 6A and 6B comprises a bearing edge 13A, 13B respectively.

Every back wheel 6A and 6B is provided on a shaft 17A, 17B respectively, which is mounted slidably on a cap 14A, 14B respectively, fixed to the rear bridge parts 12A and 12B near their free ends.

The caps 14A and 14B have through-holes 18A, 18B respectively, which are internally provided with a stop 19A, 19B respectively, which is oblique in this case.

The shaft 17A and 17B are specific in that they comprise a bolt 20A, 20B respectively, for example an M5 or M6, with a bolt head 21A, 21B respectively, a wireless wheel surface 22A, 22B respectively, and further, up to their free ends, a mounting part 23A, 23B respectively, provided with external thread.

Said mounting parts 23A and 23B are provided in a bush 24A, 24B respectively, comprising a first part 25A, 25B respectively, provided with internal thread and characterised by a first diameter, and a second part 26A, 26B respectively having a larger diameter.

The transition between the first part 25A, 25B respectively on the one hand, and the second part 26A, 26B respectively on the other hand, is gradual in this case and is thus provided with an oblique transition part 27A, 27B respectively.

Between the wireless wheel surface 22A, 22B respectively, and the rotating part of the wheels 6A and 6B is in this case provided an appropriate slide bearing 28A, 28B respectively, made of polyamide or polytetrafluoroethylene (PTFE), also called Teflon, in this case.

It is clear, however, that such a slide bearing can be made of other appropriate materials or can be replaced by a roller bearing or another type of bearing.

At the inner part of the wheel 6A, 6B respectively, the slide bearing 28A, 28B is provided with a shoulder 29A, 29B respectively.

The working and use of such a balance bike 1 according to the invention and as shown in FIGS. 4 and 5 is simple and mainly corresponds with the working as described for the balance bike 1 as shown in FIGS. 1 to 3.

The main difference relates to the adjustment of the back wheels 6A and 6B when the position of use of the frame parts 2A and 2B is changed.

The position of use as shown in FIG. 4 is what is called the stable position whereby the balance bike 1 is provided with a broad support base.

The bearing edges 13A and 13B of the back wheels 6A and 6B are in this case situated at a distance alongside the plane formed by the frame part 2A, 2B respectively, which is larger than half the distance D between the frame parts 2A and 2B, at least measured each time as of the centre lines.

Converting is done by lifting the saddle 7, as a result of which the frame parts 2A and 2B can rotate freely around the hinges 10A and 10B.

In this converted position, the bearing edges 13A and 13B of the back wheels 6A and 6B can be brought closer together, which is partly made possible thanks to the sliding construction of the back wheels 6A and 6B.

Indeed, by converting the back wheels 6A and 6B from the position of use as shown in FIG. 6, corresponding to the balance bike position as shown in FIG. 4, into the position of use as shown in FIG. 7, corresponding to the balance bike position as shown in FIG. 5, the conversion to what is called the balance position is made possible.

The back wheels 6A and 6B can be adjusted thanks to the sliding bush 24A, 24B respectively, in the through-hole 18A, respectively 18B.

In this embodiment, the shoulder 29A, 29B respectively, can be maximally moved up to among others the bush 24A, 24B respectively, as a result of which the freedom of movement is restricted to a pre-determined distance.

In the opposite sense, the oblique transition part 27A, 27B respectively of the bush 24A, 24B respectively, will form the boundary when it is moved up to the stop 19A, 19B respectively in the through-hole 18A, 18B respectively.

By adjusting the back wheels 6A and 6B according to the invention as described above, and by also folding out the frame parts 2A and 2B, the bearing edges 13A and 13B of the back wheels 6A and 6B become practically adjacent, such that a narrow or quasi single support base is offered.

In this position, it is possible to provide the saddle 7 again.

This second position of use of the balance bike 1 according to the invention, as shown in FIG. 5, is fit for children who already have some sense of balance or equilibrium or are ready to acquire it.

Also, this second position of use is called the balance position.

It is clear that such adjustable back wheels 6A and 6B can also be used in combination with the balance bike 1 as shown in FIGS. 1 to 3, i.e. with diverging frame parts 2A and 2B when the balance bike 1 is in the stable position of use, resulting in a broader supporting surface and improved stability.

The sliding back wheels 6A and 6B make it possible to offer a broad wheel base while keeping the width of the frame 2 between the saddle 7 and handlebars 3 restricted, which is to the benefit of the balance bike's ergonomics.

Indeed, when using non-sliding wheels 6A and 6B, the wheel base can be maximally the double of the width of the frame.

It is also clear that many minor features are nevertheless preferred. The essence of the invention concerns the double structure of the balance bike's frame, and the hinged connection of these frame parts 2A and 2B to an element in which the handlebars are mounted in a rotatable manner.

It should be noted that the handlebars 3 can be made symmetrical, which results in corresponding distances to the saddle 7 in both positions of use.

Alternatively, the handlebars 3 can be made somewhat asymmetrical, which results in adapted lengths between the handlebars 3 and the saddle 7 in the balance position, corresponding to the expected greater stature of the children who will use the balance bike 1 in this position.

By folding out the frame parts 2A and 2B, the back wheels 6A and 6B can assume another mutual position, allowing a transition from a stable position with a broad wheel base to a balance position whereby the wheel base is considerably narrower than in the stable position.

Additionally, the wheels 6A and 6B can be mounted slidingly in relation to a frame part 2A or 2B.

As previously stated and as shown in the figures, the axes of the hinges 10A and 10B preferably run parallel to the axis of the steering bush 8.

It was also made clear that the frame head 9 comprises two hinges 10A and 10B, one on either side of the steering bush 8, i.e. one left and one right of the steering bush 8 and all situated mainly in the same plane perpendicular to the plane of symmetry of the balance bike 1.

In the given variants of the embodiment, the axes of the hinges 10A and 10B, together with the axis of the steering bush 8, mainly form a plane which is perpendicular to the planes formed by the main bridge parts 11A and 11B, at least when the balance bike 1 is put in one of the positions of use.

It is clear, however, that small differences are possible and may have an intended associated effect, but the small differences will be governed by the phrases of the first claim, in particular as the axes of the respective hinges 10A and 10B run mainly parallel to the axis of the steering bush or holder or the like 8, even if they deviate a few degrees, and are regarded as being situated on either side thereof, even if the hinges 10A and 10B are a few centimetres closer to or further away from the position of use, compared to the position of the steering bush or holder or the like 8.

As far as the mainly parallel orientation of the axes of the hinges 10A and 10B towards the axis of the steering bush 8 is concerned, it is clear that the axes of the hinges 10A and 10B can be tilted slightly forward or backward in relation to the axis of the steering bush 8, i.e. such that the plane formed by the axes of the hinges 10A and 10B forms a small angle, for example of 5°, 10° or 15°, with the axis of the steering bush 8.

Such an angle can be applied to obtain a different angle between the axis of the steering bush 8 on the one hand, and the main bridge parts 11A and 11B on the other hand, depending on the position of use of the balance bike 1, i.e. the stable position or the balance position.

As far as the position of the axes of the hinges 10A and 10B on either side of the axis of the steering bush 8 is concerned, which axes mainly form a plane, it is clear that the axes of the hinges 10A and 10B can be provided closer to the user than the axis of the steering bush 8 over a restricted distance, for example of 1 cm, 2 cm or 3 cm, at least in a first position of use, and consequently can be removed further away from the user over a corresponding distance in the other position of use.

Such a structure can be applied in view of a somewhat deviating distance between the user and the handlebars 3 depending on the position of use of the balance bike 1, i.e. the stable position or the balance position if the goal is to maintain the symmetry of the handlebars 3.

Of course both aforesaid restricted deviations can be combined.

It is clear that, for all variants of the embodiment, the hinges 10A and 10B and the frame head 9 and all the accompanying parts allow for a rotation of at least 180° of the frame parts 2A and 2B.

The present invention is by no means restricted to the embodiments described by way of example and represented in the accompanying drawings; on the contrary, such a balance bike according to the invention can be made in all sorts of shapes and dimensions while still remaining within the scope of the invention.

The invention claimed is:

1. A balance bike comprising a frame provided with a steering bush or holder for rotatably holding handlebars with a front wheel fork, wherein one or several front wheels are connected to said front wheel fork, and wherein the balance bike comprises two back wheels, wherein the frame of the balance bike comprises two frame parts which are directly or indirectly hinge-mounted at a distance from one another to the steering bush or holder by hinges, from where the frame parts extend to the corresponding back wheel and are each provided with a back wheel, wherein the axis of the respective hinges run mainly parallel to the axis of the steering bush or holder and are situated on either side thereof, and whereby said hinges make it possible to rotate the frame parts over mainly 180°.

2. The balance bike according to claim 1, wherein every frame part comprises a mostly flat main bridge part and a rear bridge part directed slantingly onto the latter.

3. The balance bike according to claim 2, wherein the rear bridge part is not only directed slantingly onto the main bridge part, but also protrudes from the plane formed by the main bridge part, such that the two frame parts, when provided on the steering bush or holder, diverge at their rear bridge parts concerned in a first position of use, such that the most laterally located parts of the back wheels are situated at a distance alongside the plane formed by the main bridge part concerned respectively, which amounts to maximally half the distance between the main bridge parts and, at least measured as of the centre lines of the main bridge parts, and whereby the two frame parts converge at their rear bridge parts concerned in a second position of use, such that the back wheels offer a narrow or quasi single support base in that position.

4. The balance bike according to claim 2, wherein a back wheel is provided with a bearing edge which is provided at a distance alongside the plane formed by the accompanying main bridge part.

5. The balance bike according to claim 2, wherein the main bridge parts are oriented obliquely sloping in relation to the bottom surface, whereas the axis of the steering bush or holder is directed mainly perpendicular to the main bridge parts in this position, such that a trail is obtained.

6. The balance bike according to claim 1, wherein the back wheels are mounted slidingly in relation to their axis on the accompanying frame part.

7. The balance bike according to claim 1, wherein the balance bike is further provided with a saddle which spans between and connects the frame parts.

8. The balance bike according to claim 1, wherein the frame parts are each rotatable in opposite directions 180° about the hinge axis between a first position where the two back wheels are coaxially aligned adjacent one another and a second position where the two back wheels are coaxially aligned and spaced transversely apart.

9. The balance bike according to claim 8, wherein each of the frame first and second positions the frame parts are generally parallel to one another.

10. The balance bike according to claim 8, wherein the balance bike is further provided with a saddle which spans between and connects the frame parts in each of the frame first and second positions.

* * * * *